Patented Aug. 9, 1932

1,870,852

UNITED STATES PATENT OFFICE

GEORGE W. JARGSTORFF, OF GLEN ROCK, NEW JERSEY, ASSIGNOR TO THE NAUGATUCK CHEMICAL COMPANY, OF NAUGATUCK, CONNECTICUT, A CORPORATION OF CONNECTICUT

PROCESS OF MAKING STYROLS

No Drawing. Application filed October 24, 1930. Serial No. 491,083.

This invention relates to a process of making styrols, more particularly to a process for making them from halogen alkyl benzols.

It is known that beta chlor ethyl benzol decomposes on heating into styrol and hydrogen chloride, but by merely heating the material the process is not effective enough to make it of commercial use. On the other hand, alpha chlor ethyl benzol on heating decomposes into styrol and hydrogen chloride to a very slight extent if at all. I have discovered that by heating beta or alpha halogen alkyl benzol or mixtures of the two in the presence of a small quantity of an inorganic catalytic compound, both the beta and alpha halogen alkyl benzol can be decomposed into styrol and hydrogen halide in quantities sufficient to make the process commercially successful, and the catalyst used does not lose its effect readily.

An object of my invention is to provide a simple and direct method of making styrols. Another object is to provide a method of making styrols from beta or alpha halogen alkyl benzol or mixtures of the two by the use of an inorganic catalyst.

The invention therefore consists broadly in heating beta or alpha halogen alkyl benzol or mixtures of the two in the presence of an inorganic catalyst to split off a hydrogen halide from the alkyl benzol and form a styrol. It may also include the addition of a small amount of an organic base to retard polymerization of the styrol as formed.

The following specific examples illustrate the carrying out of the invention:

Example 1

100 grams of ethyl benzol were chlorinated in the dark at 100–110° C. until approximately 22.5 grams of chlorine were absorbed. The whole was fractionated after the addition of 0.1 gram of mercurous chloride, and a distillate weighing 73 grams was obtained below 160° C. This distillate contained approximately 45.5% styrol.

Example 2

100 grams of ethyl benzol were chlorinated in the dark at 100–110° C. until approximately 22.5 grams of chlorine were absorbed. The whole was then distilled to 155° C. to remove unconverted ethyl benzol. 7.25 grams of distillate were obtained. The material boiling above 155° C. was then refluxed for one hour with 0.1 parts of mercurous chloride and 10 parts of pyridine, and subsequently steam distilled. A steam distillate of 70.4 grams was obtained. A distillate of 43 grams from this steam distillate was obtained below 160° C., and this fraction contained approximately 70.4% styrol. The pyridine was added for the purpose of retarding polymerization of the styrol formed.

Example 3

100 parts of ethyl benzol were chlorinated in the dark at 100–110°C. until approximately 15 parts of chlorine by weight had been absorbed. The chlorinated mixture was fractionated and 41.1 parts of unchanged ethyl benzol were obtained. The residue was refluxed for 2½ hours at 150–175° C. in the presence of a mixture of 0.2 parts of mercurous chloride and 5 parts of diethylamine, after which the reaction mixture was separated from the catalyst and steam distilled. 46 parts of steam distillate having a styrol concentration of 42.9% were obtained.

Example 4

100 parts of ethyl benzol were chlorinated in the dark at 100–110° C. until approximately 15 parts by weight of chlorine had been absorbed. The chlorinated mixture was fractionated and 41.1 parts of unchanged ethyl benzol were obtained. The residue was refluxed for 2½ hours at 155–175° C. in the presence of 0.2 parts of mercurous chloride and 5 parts of aniline, after which the reaction mixture was separated from the catalyst and steam distilled. 35.7 parts of steam distillate having a styrol concentration of 31.9% were obtained.

It is not essential that chlorination take place in the dark, as it may take place in sunlight or ultra-violet light. But by chlorinating in the dark the conditions are made more uniform and a more uniform product assured.

In the last two examples the diethylamine and the aniline function to retard polymerization of the styrol used, and any other suitable organic bases having the same property may be used. When organic bases are used with an inorganic catalyst they may withdraw the elements of a hydrohalogen acid from the halogen alkyl benzol, and the hydrohalide thus formed may assist as a catalyzing agent. Just why the addition of the organic base prevents formation of undesired soft styrol polymers is not at present known to applicant, but the fact remains that when such organic bases are used in conjunction with the inorganic catalyst there is a considerably less formation of soft styrol polymers than in the case where the inorganic catalyst is used alone.

In place of the mercurous chloride as the catalyst, other inorganic compounds such as mercuric chloride, zinc chloride, mercuric oxide, mercuric sulphate and mercuric acetate may be used.

It will be seen that by my invention using an inorganic catalyst not only may the yield of styrol from a beta halogen alkyl benzol be greatly increased and made commercial, but also alpha halogen alkyl benzol or mixtures of the latter with the beta compound may be used for the same purpose.

While specific examples have been given, it is obvious that numerous modifications may be made in the process and it is not desired to limit the invention other than as set forth in the appended claims.

Having thus described my invention what I claim and desire to protect my Letters Patent is:

1. A process of making styrols which comprises heating a halogen alkyl benzol in the presence of an inorganic catalyst selected from the group consisting of mercurous chloride, mercuric chloride, zince chloride, mercuric oxide, mercuric sulphate and mercuric acetate to split off the corresponding halogen acid, and recovering a styrol.

2. A process of making styrols which comprises heating a halogen alkyl benzol in the presence of a mercury salt to split off the corresponding halogen acid, and recovering a styrol.

3. A process of making styrols which comprises heating a chlor ethyl benzol in the presence of a catalytic mercury salt to split off hydrochloric acid, and recovering styrol.

4. A process of making styrols which comprises heating a chlor ethyl benzol in the presence of a catalytic zinc compound to split off hydrochloric acid, and recovering styrol.

5. A process of making styrols which comprises heating a halogen alkyl benzol in the presence of a small amount of an organic base and an inorganic catalyst selected from the group consisting of mercurous chloride, mercuric chloride, zinc chloride, mercuric oxide, mercuric sulphate and mercuric acetate, to thereby split off the corresponding halogen acid and to retard polymerization of the styrol formed, and recovering the styrol.

6. A process of making styrols which comprises heating a chlor ethyl benzol in the presence of a small amount of an organic base and an inorganic catalyst selected from the group consisting of mercurous chloride, mercuric chloride, zinc chloride, mercuric oxide, mercuric sulphate and mercuric acetate, to thereby split off hydrochloric acid and to retard polymerization of the styrol formed, and recovering the styrol.

7. A process of making styrols which comprises heating a chlor ethyl benzol in the presence of a catalytic mercury salt and a small amount of pyridine, to thereby split off hydrochloric acid and to retard polymerization of the styrol formed, and recovering the styrol.

8. A process of making styrols which comprises heating a chlor ethyl benzol in the presence of a catalytic zinc compound and a small amount of pyridine, to thereby split off hydrochloric acid and to retard polymerization of the styrol formed, and recovering the styrol.

9. A process of making styrols which comprises heating a chlor ethyl benzol in the presence of a mercury chloride and a small amount of pyridine, to thereby split off hydrochloric acid and to retard polymerization of the styrol formed, and recovering the styrol.

10. A process of making styrols which comprises heating a chlor ethyl benzol under a reflux condenser in the presence of a mercury chloride and a small amount of pyridine, to thereby split off hydrochloric acid and to retard polymerization of the styrol formed, steam distilling, and distilling the steam distillate to approximately 160° C. to recover a distillate containing styrol.

Signed at Passaic, county of Passaic, State of New Jersey, this 20th day of October, 1930.

GEORGE W. JARGSTORFF.